United States Patent
Kuras

(10) Patent No.: US 6,295,497 B1
(45) Date of Patent: Sep. 25, 2001

(54) METHOD AND APPARATUS FOR ADAPTIVELY SHIFTING RANGES IN A CONTINUOUSLY VARIABLE TRANSMISSION

(75) Inventor: Brian D. Kuras, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/428,046

(22) Filed: Oct. 27, 1999

(51) Int. Cl.$^7$ .......................... G06F 17/00; G06F 19/00; G06F 7/00
(52) U.S. Cl. ............................ 701/51; 701/61; 701/64; 477/46; 477/68; 477/91
(58) Field of Search ..................... 701/51, 55, 61, 701/64; 477/46, 49, 68, 91, 115

(56) References Cited

U.S. PATENT DOCUMENTS

| | | | |
|---|---|---|---|
| 4,531,431 | 7/1985 | Dreher et al. ............................. | 477/2 |
| 5,054,599 | 10/1991 | Marcott ............................... | 192/85 R |
| 5,105,922 | 4/1992 | Yant ................................... | 192/85 R |
| 5,199,313 | 4/1993 | Muller ................................. | 74/335 |
| 5,270,930 | 12/1993 | Ito et al. ............................... | 701/69 |
| 5,301,783 | 4/1994 | Malloy ............................... | 192/85 R |
| 5,337,871 | 8/1994 | Testerman ......................... | 192/85 R |
| 5,343,994 | 9/1994 | Kyrtsos ............................... | 192/85 R |
| 5,467,854 | 11/1995 | Creger et al. ......................... | 475/128 |
| 5,505,100 | 4/1996 | Mitchell et al. ........................ | 74/335 |
| 5,551,930 | 9/1996 | Creger et al. ......................... | 477/130 |
| 5,573,473 | 11/1996 | Asayama et al. ...................... | 447/63 |
| 5,580,332 | 12/1996 | Mitchell et al. ..................... | 477/143 |
| 5,586,953 | * 12/1996 | Abo ........................................ | 477/47 |
| 5,682,315 | * 10/1997 | Coutant et al. ......................... | 701/51 |
| 5,790,968 | * 8/1998 | Kashiwabara et al. ................ | 701/51 |

* cited by examiner

Primary Examiner—William A. Cuchlinski, Jr.
Assistant Examiner—Gertrude Arthur
(74) Attorney, Agent, or Firm—John W. Morrison

(57) ABSTRACT

A transmission includes a transmission input speed sensor which generates transmission input speed signals indicative of an input speed to the transmission and a transmission output speed sensor which generates transmission output speed signals indicative of an output speed of the transmission. The transmission further includes a controller operable to receive the transmission input speed signal and the transmission output speed signal and determine a transmission ratio based on the transmission input speed signal and the transmission output speed signal. The controller is further operable to calculate a rate of change of the transmission ratio and initiate a transmission range shift based on the transmission ratio, the rate, and a shift completion ratio such that the transmission range shift is completed when the transmission is at the predetermined shift completion ratio.

21 Claims, 2 Drawing Sheets

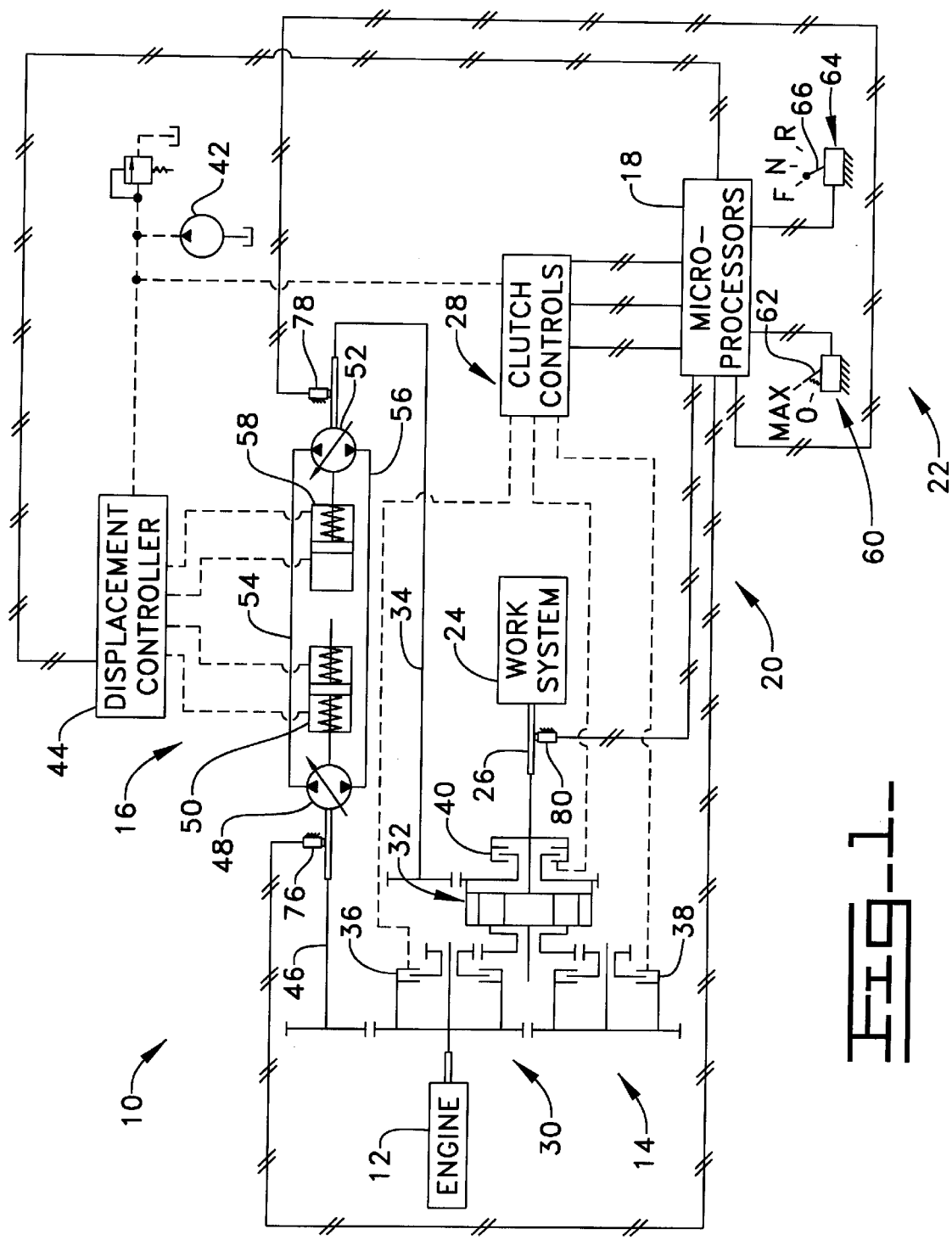

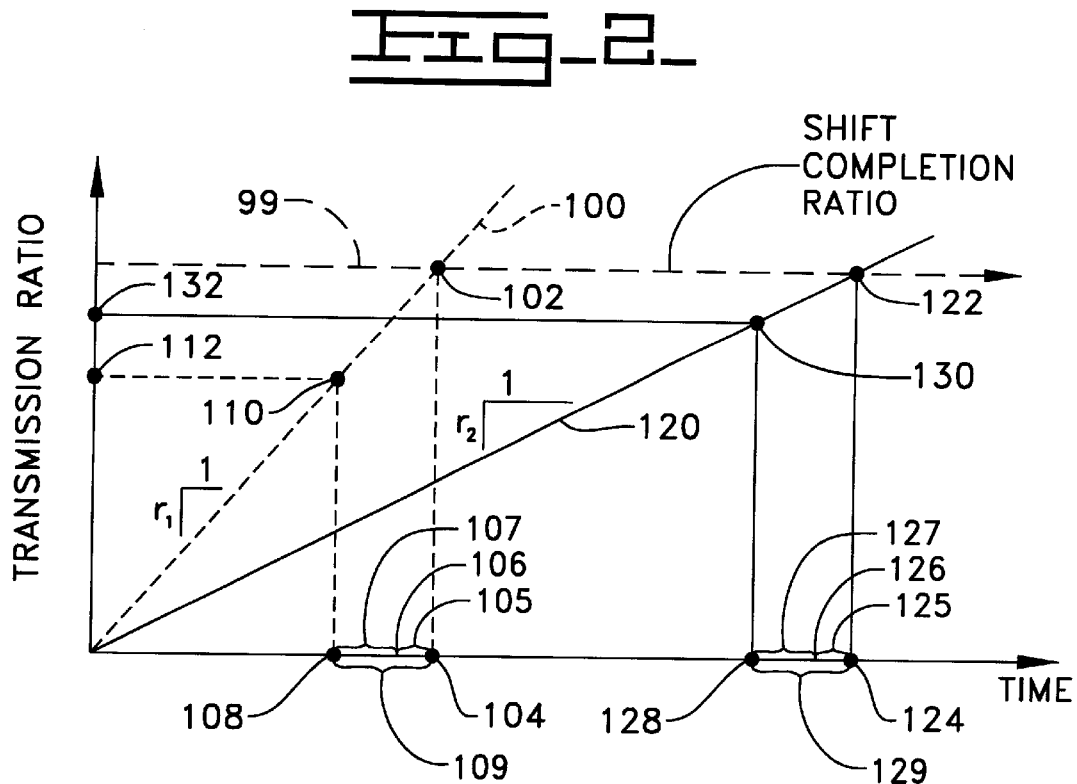
Fig_2_
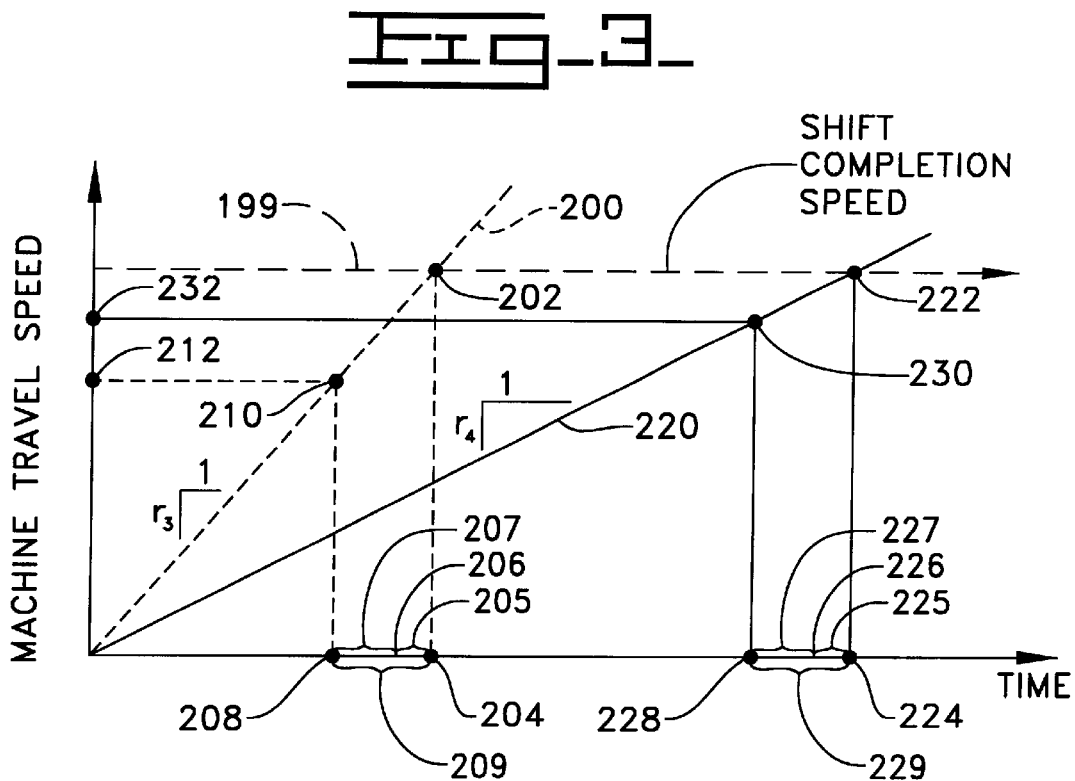
Fig_3_

METHOD AND APPARATUS FOR ADAPTIVELY SHIFTING RANGES IN A CONTINUOUSLY VARIABLE TRANSMISSION

TECHNICAL FIELD OF THE INVENTION

The present invention generally relates to continuously variable transmission, and more specifically to a method and apparatus for adaptively shifting ranges in a continuously variable transmission. In particular, the initiation of an engagement of a clutch is varied based on rate of change of transmission ratio or travel speed.

BACKGROUND OF THE INVENTION

Many work machines, particularly earth working machines, use a continuously variable transmission to drive traction wheels or tracks of the work machine. Typically, a hydrostatic drive, consisting of a hydraulic pump and a hydraulic motor, provides a continuously variable speed output to the wheels or tracks of the work machine. In particular, the speed output can be continuously varied by controlling the displacements of either the hydraulic pump or the hydraulic motor which comprise the hydrostatic drive system.

In order to operate over a wide range of operating conditions, the output of the continuously variable hydrostatic transmission is transmitted through a mechanical transmission. The mechanical transmission has a number of discrete transmission ranges corresponding to different operating speeds of the work machine. The combination of the continuously variable transmission and the mechanical transmission allows a continuously variable transmission to operate over a wider range of speeds than is possible using the continuously variable transmission alone.

One drawback to having a number of transmission ranges is that power may not be smoothly transmitted through the transmission during a transmission range shift from one transmission range to another. Typically, an oncoming clutch takes a time to fill the volume of the clutch before actual engagement. Therefore, the acceleration of the work machine must be stopped to wait for the oncoming clutch to be filled and ramped up to pressure. This does not allow a constant and smooth acceleration through the shift. In particular, if a shift is performed before the desired transmission ratio, a shock may be transmitted through the transmission. On the other hand, if the shift is performed after the desired transmission ratio, the shift will appear slow. In either case, the operator has the perception that the transmission ratio is not being smoothly varied.

One of the advantages of the continuously variable transmission is that the continuous variability of the transmission ratio provides the operator with perception that the work machine is operating smoothly. If the shift from one transmission range to another is not performed at the desired transmission ratio, the perception of smooth operation is lost as the operator feels either the shock or the slow shift.

What is needed therefore is a method and apparatus for adaptively shifting ranges in a transmission which overcomes the above-mentioned drawbacks.

DISCLOSURE OF THE INVENTION

In accordance with a first embodiment of the present invention, there is provided a continuously variable transmission. The transmission includes a transmission input speed sensor which generates speed signals indicative of an input speed to the transmission and a transmission output speed sensor which generates speed signals indicative of an output speed of the transmission. The transmission further includes a controller operable to receive the transmission input speed signals and the transmission output speed signals and determine a transmission ratio based on the transmission input speed signal and the transmission output speed signal. The controller is further operable to calculate a rate of change of the transmission ratio and initiate a transmission range shift based on the transmission ratio, the rate, and the predetermined shift completion ratio such that the transmission range shift is completed when the transmission is at the predetermined shift completion ratio.

In accordance with a second embodiment of the present invention, there is provided a work machine having a transmission. The work machine includes a transmission output speed sensor which generates transmission speed signals indicative of an output speed of the transmission. The work machine further includes a controller operable to receive the transmission output speed signal and determine a travel speed of the work machine. The controller is further operable to calculate a rate of change of the travel speed and initiate engagement of a clutch based on the travel speed, the rate, and a predetermined shift completion speed such that the clutch is fully engaged when the work machine is operating at the predetermined shift completion speed.

In accordance with a third embodiment of the present invention, there is provided a method for controlling a continuously variable transmission. The transmission includes a transmission input speed sensor, a transmission output speed sensor, and a controller. The method includes the steps of generating transmission input speed signals indicative of an input speed to the transmission with the transmission input speed sensor and generating transmission output speed signals indicative of an output speed of the transmission with the transmission output speed sensor. The method further includes the steps of receiving the transmission input speed signal and the transmission output speed signals and determining a transmission ratio with the controller and calculating a rate of change of the transmission ratio. The method yet further includes the step of initiating a transmission range shift based on the transmission ratio, the rate, and a predetermined shift completion ratio such that the transmission range shift is completed when the transmission is at the predetermined shift completion ratio.

BRIEF DESCRIPTION OF THE DRAWINGS

FIG. 1 is a schematic view of a hydro-mechanical, continuously variable transmission which incorporates the features of the present invention therein;

FIG. 2 is a graph of transmission ratio versus time illustrating the ratios at which a range shift is initiated for different rates of change of transmission ratio; and FIG. 3 is a graph of machine travel speed versus time illustrating the machine travel speeds at which a range shift is initiated for different rates of change of travel speed.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a transmission assembly 10 that incorporates the features of the present invention therein. The transmission assembly 10 is adapted for use in a work machine, such as a loader (not shown), having an engine 12. The transmission assembly 10 is of the continuously variable type and includes a mechanical transmission 14, a continuously variable transmission 16, a micro-processor based controller 18, a sensing arrangement 20 and a command input arrangement 22. Although the transmission assembly 10 is shown to be a continuously variable hydro-mechanical transmission, the invention is equally applicable to any type of continuously variable transmission including a hydro-mechanical, hydrostatic, or electromechanical transmissions. A work system 24 is connected to the is transmission assembly 10 by a drive shaft 26. The work system 24 is typically the drive wheels or tracks of the work machine.

The mechanical transmission 14 and an associated clutch control arrangement 28 are operatively connected to the engine 12 through a gear arrangement 30. The mechanical transmission 14 includes a summing planetary arrangement 32 operatively connected to both the engine 12 through the gear arrangement 30 and to the hydrostatic transmission 16 through a motor output shaft 34. The output of the summing planetary arrangement 32 is connected to the drive shaft 26. The mechanical transmission 14 further includes directional high speed clutches 36, 38 and a low speed clutch 40. The clutch control arrangement 28 is connected to a source of pressurized pilot fluid, such as a pilot pump 42. The controller 18 is operative to control engagement and disengagement of the respective clutches 36, 38 and 40 in response to electrical signals from the controller 18 to the clutch controller 28.

The hydrostatic transmission 16 and a displacement controller 44 are operatively connected to the engine 12 through a pump input drive shaft 46. The hydrostatic transmission 16 includes a variable displacement pump 48, a pump displacement actuator 50, a variable displacement motor 52 fluidly connected to the variable displacement pump 48 by conduits 54, 56, and a motor displacement actuator 58. The displacement controller 44 is connected to the pilot pump 42 and the controller 18. The displacement controller 44 controls movement of the respective pump and motor displacements actuators 50, 58 in response to control signals from the controller 18, thus controlling the transmission ratio of the continuously variable transmission 16.

The command input arrangement 22 includes a speed input mechanism 60 having a first input device or speed pedal 62 moveable from a zero speed position to a maximum speed position for transmitting a desired velocity signal to the controller 18. The command input arrangement further includes a second input device or directional control 64 for transmitting a directional control signal to the controller 18 in response to the position of a lever 66. The controller 18 includes RAM and ROM (not shown) that stores transmission control software, predetermined shift completion ratios or speeds at which shifts are to be completed, clutch fill periods, and clutch ramp periods. Alternately, for synchronous range shifts, the RAM and ROM store a single time period required to shift a clutch using a non-modulated flow supplied by the pump 42.

The sensing arrangement 20 includes a transmission input speed sensor 76 operative to sense the speed of the pump input shaft 46 and direct a transmission input speed signal representative of the transmission input speed to the controller 18. A motor speed sensor 78 is operative to sense the speed of the motor output shaft 34 and direct a motor speed signal representative of the motor output speed to the controller 18. The motor speed signal combined with the transmission input speed signal can also be used to determine a transmission output speed and a machine travel speed if the engagement state of the clutches 36, 38, and 40 are known. A transmission output speed sensor 80 is operative to sense the transmission output speed and direct a transmission output speed signal to the controller 18. Either of the motor speed sensor 78 combined with the input speed sensor 76 or the transmission output speed sensor 80 can be used to calculate the transmission output speed or the machine travel speed. However, in the present invention, the motor speed sensor 78 is used to precisely control the displacement of the pump 48 and the motor 50 and therefore has a much higher resolution and lower dropout than the transmission output speed sensor 80. Thus, it is preferable to use the motor speed sensor 78 and the engagement state of the clutches 36, 38, and 40 to determine the transmission output speed and the machine travel speed. However, it is still possible and practical to use the output speed sensor 80 to determine machine travel speed.

The controller 18 is further operable to calculate a transmission ratio, i.e. the ratio of the transmission output speed to the transmission input speed, using the transmission input speed signal, the motor speed signal, and the engagement state of the clutches 36, 38, and 40. Alternately, the controller 18 is operable to calculate the transmission ratio using the transmission input speed signal and the transmission output speed signal.

The controller 18 is yet further operable to calculate travel speed of the work machine using the motor speed signal combined with the transmission input speed signal and the engagement state of the clutches 36, 38, and 40. Alternately, the controller 18 is operable to calculate the to travel speed of the work machine using only the transmission output speed signal.

Referring now to FIG. 2, there is shown the rate of change of transmission ratio as the transmission 10 approaches a transmission range shift at the predetermined shift completion ratio 99. The predetermined shift completion ratio is calculated continuously by the controller 18 and is predetermined at the time at which the transmission range shift is initiated. The transmission ratio is plotted for two different operating conditions 100, 120. Under the first operating condition 100, the transmission ratio increases at a relatively rapid rate $r_1$. To achieve the best shift from the current transmission range to a subsequent transmission range, it is necessary to complete the range shift at point 102 at the same time the transmission 10 is operating at the shift completion ratio 99.

In order to complete the shift at the point 102, the shift must be completed at a time 104. In the preferred embodiment, the controller 18 must allow for two periods, a fill period 107 and a ramp period 105, prior to the completion of the range shift at the time 104. The fill period 107, the time difference between time a 108 and time a 106, is the time required to completely fill the respective clutch 36, 38, or 40 with fluid. The time t required to complete the fill period 107 can be calculated using the following equation for fluid flow through an orifice:

$$t = \frac{V}{C_D A} \sqrt{\frac{\rho}{2\Delta P}}$$

where V is a fluid volume of the respective clutch 36, 38, or 40, A is an effective valve opening area used to fill the clutch 36, 38, or 40, $C_D$ is a discharge coefficient of the area A, $\Delta P$ is the pressure difference between the pressure supplied by the pump 42 and the pressure within respective clutch 36, 38 or 40, and $\rho$ is the density of the fluid. It should be appreciated that the time t is not recalculated for each shift. Practically, the fill time t is determined empirically by a test engineer. The fill time t is a function of operating temperature and clutch configuration. These empirically determined values at multiple operating conditions are stored in the ROM of the controller 18. The ramp period 105, the time difference between the time 106 and a time 104, is the time required to modulate the pressure between the fill hold pressure and the maximum clutch pressure. The ramp period 105 must also be empirically determined for the respective configuration of the transmission 10 and is stored in the ROM of the controller 18.

Once the controller 18 determines the rate of change of the transmission ratio $r_1$, the fill period 107, and the ramp period 105, the controller 18 initiates the transmission range shift at the time 108 which ensures that the transmission range shift is completed when the transmission ratio reaches the shift completion ratio 99. The time 108 corresponds to a point 110 of the first operating condition and a transmission ratio 112. The range shift is initiated by the controller 18 sensing that the actual transmission ratio is greater than the ratio 112 and sending clutch control signals to the clutch controller 28 so as to advance fluid from the pump 42 to fill and then ramp the pressure within the respective clutch 36, 38, or 40.

During the second operating condition 120, the transmission ratio increases at a second rate $r_2$. Once the controller 18 determines the second rate of change $r_2$ of the transmission ratio, the fill period 127, and the ramp period 125, the controller 18 initiates the transmission range shift at the time 128 which ensures that the transmission range shift is completed when the transmission ratio reaches the shift completion ratio 99. The time 128 corresponds to a point 130 of the second operating condition and a transmission ratio 132 The shift is initiated by the controller 18 sensing that the actual transmission ratio is greater than the ratio 132 and sending clutch control signals to the clutch controller 28 so as to advance fluid from the pump 42 to fill and then ramp the pressure within the respective clutch 36, 38, or 40.

It should be appreciated that the variation of the transmission ratio 112, 132 at which the range shift is initiated by controller 18 adaptively ensures that upon completion of the range shift, the transmission ratio will have reached the shift completion ratio 99. In particular, during the first operating condition 100, the shift is initiated at the transmission ratio 112 whereas under the second operating condition 120, the shift is initiated at the transmission ratio 132. In both the first operating condition 100 and the second operating condition 120 the shift is completed when the transmission ratio reaches the shift completion ratio 99.

In addition, it may become necessary to abort the shift from one transmission range to another. In particular, the load on the work machine may increase just after the shift has been initiated at the time 108, 128 and the controller 18 may determine that it is desirable to control the transmission ratio to remain in the current transmission range. The controller 18 then generates an abort signal which is sent to the clutch controls 28. If the abort signal is received prior to the time 106 of the first operating condition 100, or the time 126 of the second operating condition 120, the range shift which is in the fill period 107, 127 can be aborted by the controller 18 sending control signals to the clutch controls 28 so as to cause the clutch controls 28 to cease advancing fluid from the pump 42 to the respective clutch 36, 38, or 40. The shift can be aborted before the time 106, 126 because the plates and disks of the respective clutch 36, 38, or 40 have not become engaged with one other.

Alternately, in the present invention, the shifts from one range to the other range may be synchronous or nearly synchronous, i.e. there is little or no speed difference between the plates and disks within the respective clutch 36, 38, or 40 during the transmission range shift. When the transmission 10 has a synchronous range shift, the controller 18 can make a determination if the shift will not be completed by the time the transmission ratio reaches the shift completion ratio 99. If the controller determines that the range shift will not be completed prior to reaching the shift completion ratio 99, the controller 18 generates command signals which cause the clutch controls 28 to ramp the pressure supplied to the respective clutch 36, 38, or 40 even if the end of the fill period 107, 127 has not been reached. The range shift is thus completed more rapidly than is possible by postponing the pressure ramp until the end of the fill period 107, 127.

Moreover, when the transmission 10 has a synchronous range shift, the controller 18 can allow for a single period 109, 129 during which fluid at a non modulated pressure from the pump 42 is applied to the respective clutch 36, 38, or 40. This allows the shift to be completed much quicker than filling and modulating the pressure as described above. Applying fluid from the pump 42 at a single pressure has the advantage of requiring less expensive valves within the respective clutch 36, 38, or 40 which do not need to controllably vary the pressure supplied to respective clutch 36, 38 or 40.

Controllably varying pressure from the pump 42 controls the slip between the plates and disks as the pressure within the clutch 36, 38, or 40 is ramped up. However, during synchronous range shifts, there is little or no slip between the plates and disks of the respective clutch 36, 38, 40, and thus, there is no need to controllably vary the pressure during the range shift. Therefore, the controller 18 needs only to store a single time period 109, 129 required to accomplish the range shift. This single time period 109, 129 is empirically determined at multiple operating conditions and is stored in the ROM of the controller 18 for a given configuration of the transmission 10.

Once the controller 18 determines the single time period 109, 129, the controller 18 initiates the transmission range shift at the time 108 (for the first operating condition 100) or the time 128 (for the second operating condition 120) which corresponds to the transmission ratios 112, 132. The range shift is initiated by the controller 18 sensing that the actual transmission ratio is greater than the ratio 112, 132 and sending clutch control signals to the clutch controller 28 so as to advance fluid at the non-modulated pressure from the pump 42 to the respective clutch 36, 38, or 40.

Referring now to FIG. 3, in a second embodiment of the present invention, there is shown the rate of change of machine travel speed as the transmission 10 approaches a transmission range shift at the predetermined shift completion speed 199.

The travel speed is plotted for two different operating conditions 200, 220. During the third operating condition 200 the travel speed increases at a relatively rapid third rate $r_3$. To achieve the best shift from the current transmission range to a subsequent transmission range, it is necessary to complete the range shift at a point 202 at the same time the transmission 10 reaches the predetermined shift completion speed 199.

In order to complete the shift at the point 202, the shift must be completed at a time 204. In the preferred embodiment, the controller 18 must allow for two periods, a fill period 207 and a ramp period 205, prior to the completion of the range shift at the time 204. The fill period 207, the time difference between a time 208 and a time 206, is the time required to completely fill the respective clutch 36, 38, or 40 with fluid. Practically, the fill time t is determined empirically by a test engineer. The fill time t is a function of operating temperature and clutch configuration. These empirically determined values at multiple operating conditions are stored in the ROM of the controller 18. The ramp period is also empirically determined for a given configuration of the transmission 10 and stored in the ROM of the controller 18.

Once the controller 18 determines the rate of change $r_3$ of the travel speed, the fill period 207, and the ramp period 205, the controller 18 initiates the transmission range shift at the time 208 which ensures that the transmission range shift is completed when the travel speed reaches the shift completion speed 199. The time 208 corresponds to a point 210 of the first operating condition and a travel speed 212 The range shift is initiated by the controller 18 sensing that the travel speed is greater than the speed 212 and sending clutch control signals to the clutch controller 28 so as to advance fluid from the pump 42 to fill and then ramp the pressure within the respective clutch 36, 38, or 40.

During the fourth operating condition 220, the travel speed increases at a fourth rate $r_4$. Once the controller 18 determines fourth rate of change $r_4$ of the travel speed, the fill period 227, and the ramp period 225, the controller 18 initiates the transmission range shift at the time 228 which ensures that the transmission range shift is completed when the travel speed reaches the shift completion speed 199. The time 228 corresponds to a point 230 of the fourth operating condition and a travel speed 232. The range shift is initiated by the controller 18 sensing that the actual travel speed of the machine is greater than the speed 232 and sending clutch control signals to the clutch controller 28 so as to advance fluid from the pump 42 to fill and then ramp the pressure within the respective clutch 36, 38, or 40.

It should be appreciated that the variation of the travel speed 212, 232 at which the range shift is initiated by controller 18 adaptively ensures that upon completion of the range shift, the travel speed will have reached the shift completion speed 199. In particular, during the third operating condition 200, the shift is initiated at the travel speed 212 whereas under the fourth operating condition 220, the shift is initiated at the travel speed 232. In both the third operating condition 200 and the fourth operating condition 220, the range shift is complete when the travel speed reaches the shift completion speed 199.

In addition, it may become necessary to abort the shift from one transmission range to another. In particular, the load on the work machine may increase just after the shift has been initiated at the time 208, 228, and the controller 18 may determine that it is desirable to remain in the current transmission range. The controller 18 then generates the abort signal which is sent to the clutch controls 28. If the abort signal is received prior to the time 206 of the third operating condition 200, or the time 226 of the fourth operating condition 220, the range shift, which is in the fill period 207, 227, can be aborted by the controller 18 sending control signals to the clutch controls 28 so as to cause the clutch controls 28 to cease advancing fluid from the pump 42 to the respective clutch 36, 38, or 40. The range shift can be aborted before the time 206, 226 because the plates and disks of the respective clutch 36, 38, or 40 have not become engaged with one other.

Alternately, in the present invention, the shifts from one range to the other range may be synchronous or nearly synchronous, i.e. there is little or no speed difference between the plates and disks within the respective clutch 36, 38, or 40 during the range shift. When the transmission 10 has a synchronous range shift, the controller 18 can make a determination if the shift will not be completed by the time the machine travel speed reaches the shift completion speed 199. If the controller determines that the range shift will not be completed prior to reaching the shift completion speed 199, the controller 18 generates command signals which cause the clutch controls 28 to ramp the pressure supplied to the respective clutch 36, 38, or 40 even if the end of the fill period 207, 227 has not been reached. The range shift is thus completed more rapidly than is possible by postponing the pressure ramp until the end of the fill period 207, 227.

Moreover, when the transmission 10 has a synchronous range shift, the controller 18 can allow for a single period 209, 229 during which fluid at a single pressure from the pump 42 is applied to the respective clutch 36, 38, or 40. Applying fluid from the pump 42 at a single pressure has the advantage of requiring less expensive valves within the respective clutch 36, 38, or 40 which do not need to controllably vary the pressure supplied to respective clutch 36, 38 or 40.

Controllably varying pressure from the pump 42 controls the slip between the plates and disks as the pressure within the clutch 36, 38, 40 is ramped up. However, during synchronous range shifts, there is little or no slip between the plates and disks of the respective clutch 36, 38, 40, and thus, there in no need to controllably vary the pressure during the range shift. Therefore, the controller 18 needs only to store a single time period 209, 229 required to accomplish the range shift. This single time period 209, 229 is empirically determined at multiple operating conditions and stored in the ROM of the controller 18 for a given configuration of the transmission 10.

Once the controller 18 determines the single time period 209, 229 the controller 18 initiates the transmission range shift at the time 208 (for the third operating condition 200) or the time 228 (for the fourth operating condition 220) which corresponds to the travel speeds 212, 232. The shift is initiated by the controller 18 sensing that the actual travel speed is greater than the speed 212, 232 and sending clutch control signals to the clutch controller 28 so as to advance fluid at the non-modulated pressure from the pump 42 to the respective clutch 36, 38, or 40.

Industrial Applicability

In operation, in response to operator inputs and load conditions, the controller 18 determines a rate of change $r_1$ of the transmission ratio for a first operating condition 100. Once the rate of change $r_1$ of the transmission ratio has been determined, the controller 18 determines when to initiate the transmission range shift to complete the range shift at the shift completion ratio 99. In particular, the controller 18 calculates the time required to shift using either the fill period 107 and the ramp period 105 or the single period 109 to determine when to initiate the range shift. Upon determining the time required to complete the shift, the controller 18 calculates the transmission ratio 112 at which the shift should be initiated based on the rate $r_1$. Under different conditions such as the second operating condition 120, the initiation of the shift is adaptively altered to the transmission ratio 132 based on the rate $r_2$. In addition, it is possible to abort the range shift any time prior to the end of the fill period 107, 127 at the time 106, 126 because the plates and disks of the respective clutch 36, 38, or 40 have not been engaged.

Alternately, the controller 18 determines a rate of change $r_3$ of the travel speed for the third operating condition 200. Once the rate of change $r_3$ of the travel speed has been determined, the controller 18 determines when to initiate the transmission range shift to complete the range shift at the shift completion speed 199. In particular, the controller 18 calculates the time required to shift using either the fill period 207 and the ramp period 205 or the single period 209 to determine when to initiate the range shift. Upon determining the time required to complete the shift, the controller 18 calculates the travel speed 212 at which the shift should be initiated based on the rate $r_3$. Under different conditions such as the fourth operating condition 220, the initiation of the range shift is adaptively altered by the controller 18 to the travel speed 232 based on the rate $r_4$. In addition, it is possible to abort the shift any time prior to the end of the fill period 207, 227 at the time 206, 226 because the plates and disks of the respective clutch 36, 38, or 40 have not been engaged.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A continuously variable transmission, comprising:

a transmission input speed sensor which generates transmission input speed signals indicative of an input speed to said transmission;

a transmission output speed sensor which generates transmission output speed signals indicative of an output speed of said transmission; and a controller operable to (i) receive said transmission input speed signals and said transmission output speed signals, (ii) determine a transmission ratio based on said transmission input speed signal and said transmission output speed signal, (iii) calculate a rate of change of said transmission ratio, and (iv) initiate a transmission range shift based on said transmission ratio, said rate, and a predetermined shift completion ratio such that said transmission range shift is completed when said transmission reaches said predetermined shift completion ratio.

2. The apparatus of claim 1, wherein said transmission output sensor measures an intermediate motor speed.

3. The apparatus of claim 1, wherein said transmission range shift is initiated at a time which allows for (i) a fill period whereby a clutch is filled with fluid, and (ii) a ramp period whereby fluid pressure within said clutch is increased to complete said transmission range shift as said transmission reaches said predetermined shift completion ratio.

4. The apparatus of claim 3, wherein the time t required to complete said fill period is calculated using the following equation:

$$t = \frac{V}{C_D A} \sqrt{\frac{\rho}{2\Delta P}}$$

where V is a fluid volume of said clutch, A is an effective area used to fill said clutch, $C_D$ is a discharge coefficient of the area A, $\Delta P$ is the pressure difference between a fluid source and said clutch, and $\rho$ is said density of said fluid.

5. The apparatus of claim 3, wherein said transmission range shift can be aborted any time prior to the end of said fill period.

6. The apparatus of claim 3, wherein the ramp period is initiated prior to the completion of the fill period if the transmission ratio reaches the shift completion ratio prior to the end of the fill period.

7. The apparatus of claim 1, wherein said transmission range shift is initiated at a transmission ratio which allows for a application of fluid at a non-modulated pressure to complete said transmission range shift as said transmission reaches said predetermined shift completion ratio.

8. A work machine having a transmission, comprising:

a transmission output speed sensor which generates transmission speed signals indicative of said output speed of said transmission; and a controller operable to (i) receive said transmission output speed signal, (ii) determine a travel speed of said work machine, (iii) calculate a rate of change of said travel speed, and (iv) initiate engagement of a clutch based on said travel speed, said rate, and a predetermined shift completion speed such that said clutch is fully engaged when said work machine reaches said predetermined shift completion speed.

9. The apparatus of claim 8, wherein said transmission output speed sensor measures an intermediate motor speed.

10. The apparatus of claim 8, wherein said clutch engagement is initiated at a time which allows for (i) a fill period whereby said clutch is filled with fluid, and (ii) a ramp period whereby fluid pressure within said clutch is increased to fully engage said clutch as said work machine reaches said predetermined shift completion speed.

11. The apparatus of claim 10, wherein the time t required to complete said fill period is calculated using the following equation:

$$t = \frac{V}{C_D A} \sqrt{\frac{\rho}{2\Delta P}}$$

where V is a fluid volume of said clutch, A is an effective area used to fill said clutch, $C_D$ is a discharge coefficient of said area A, $\Delta P$ is a pressure difference between a fluid source and said clutch, and $\rho$ is a density of said fluid.

12. The apparatus of claim 10, wherein said clutch engagement can be aborted any time prior to the end of said fill period.

13. The apparatus of claim 10, wherein the ramp period is initiated prior to the completion of the fill period if the travel speed reaches the shift completion speed prior to the end of the fill period.

14. The apparatus of claim 8, wherein said engagement of said clutch is initiated at a time which allows for application of fluid at a non-modulated pressure to fully engage said clutch as said work machine reaches said predetermined shift completion speed.

15. A method for controlling a continuously variable transmission having (i) a transmission input speed sensor, (ii) a transmission output speed sensor, and (iii) a controller, comprising the steps of:

generating transmission input speed signals indicative of an input speed of the transmission with the transmission input speed sensor;

generating transmission output speed signals indicative of an output speed of the transmission with the transmission output speed sensor;

receiving the transmission input speed signals and the transmission output speed signals and determining a transmission ratio therefrom with the controller;

calculating a rate of change of the transmission ratio; and initiating a transmission range shift based on the transmission ratio, the rate, and a predetermined shift completion ratio such that the transmission range shift is completed when the transmission reaches the predetermined shift completion ratio.

16. The method of claim 15, wherein the transmission speed signal generating step includes the step of determining an intermediate motor speed.

17. The method of claim 15, further including the steps of:

filling a clutch with fluid after the initiating step; and increasing fluid pressure within the clutch to complete the transmission range shift as the transmission reaches the predetermined shift completion ratio after the initiating step.

18. The method of claim 17, wherein the time t required to complete the filling step is calculated using the following equation:

$$t = \frac{V}{C_D A} \sqrt{\frac{\rho}{2\Delta P}}$$

where V is a fluid volume of the clutch, A is an effective area used to fill the clutch, $C_D$ is the discharge coefficient of the area A, $\Delta P$ is the pressure difference between a fluid source and the clutch, and $\rho$ is the density of the fluid.

19. The method of claim 17, further including the step of aborting the transmission range shift prior to the end of the filling step.

20. The method of claim 17, further comprising the step of initiating the increasing pressure step prior to the completion of the filling step if the transmission ratio reaches the shift completion ratio prior to the end of the filling step.

21. The method of claim 15, further including the step of applying a fluid at a non modulated pressure to complete the transmission range shift after the initiating step.

* * * * *